United States Patent
Li et al.

(10) Patent No.: US 12,344,723 B2
(45) Date of Patent: Jul. 1, 2025

(54) METHODS FOR REDUCING ALDEHYDE EMISSIONS IN POLYETHER POLYOLS AND POLYURETHANE FOAMS

(71) Applicant: Dow Global Technologies LLC, Midland, MI (US)

(72) Inventors: Haiying Li, Shanghai (CN); Shaoguang Feng, Shanghai (CN); Wenbin Bao, Shanghai (CN); Ping Zhang, Shanghai (CN); Jie Ji, Shanghai (CN); Jian Zou, Shanghai (CN); Zhengming Tang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 654 days.

(21) Appl. No.: 17/638,259

(22) PCT Filed: Aug. 30, 2019

(86) PCT No.: PCT/CN2019/103566
§ 371 (c)(1),
(2) Date: Feb. 25, 2022

(87) PCT Pub. No.: WO2021/035662
PCT Pub. Date: Mar. 4, 2021

(65) Prior Publication Data
US 2022/0363856 A1    Nov. 17, 2022

(51) Int. Cl.
*C08J 9/12* (2006.01)
*C08G 18/48* (2006.01)
*C08G 18/50* (2006.01)
*C08G 65/333* (2006.01)

(52) U.S. Cl.
CPC .......... *C08J 9/125* (2013.01); *C08G 18/4829* (2013.01); *C08G 18/5069* (2013.01); *C08G 65/33396* (2013.01); *C08G 2110/0083* (2021.01); *C08J 2201/022* (2013.01); *C08J 2203/10* (2013.01); *C08J 2375/08* (2013.01)

(58) Field of Classification Search
CPC ...... C08G 18/10; C08G 18/285; C08G 18/48; C08G 18/4816; C08G 18/4829; C08G 18/4837; C08G 18/4883; C08G 18/5069; C08G 18/76; C08G 18/7607; C08G 18/7621; C08G 18/7664; C08G 65/33396; C08G 2101/00; C08G 2110/0008; C08G 2110/0041; C08G 2110/005; C08G 2110/0058; C08G 2110/0083; C08G 2350/00; C08J 9/125; C08J 2201/022; C08J 2203/10; C08J 2375/08; C08K 5/20
See application file for complete search history.

(56) References Cited

U.S. PATENT DOCUMENTS

| | | |
|---|---|---|
| 2019/0119460 A1 | 4/2019 | Tomovic et al. |
| 2019/0369761 A1 | 12/2019 | Guard et al. |
| 2020/0079923 A1 | 3/2020 | Albach et al. |

FOREIGN PATENT DOCUMENTS

| | | | | |
|---|---|---|---|---|
| CN | 105764946 A | * | 7/2016 | ............. C08G 18/14 |
| WO | 2018/145283 A | | 8/2018 | |
| WO | 2018/148959 A | | 8/2018 | |
| WO | 2019/119196 A | | 6/2019 | |
| WO | 2019/121273 A | | 6/2019 | |

* cited by examiner

*Primary Examiner* — John M Cooney

(57) ABSTRACT

Polyurethane foams are made by curing a reaction mixture that contains an aromatic polyisocyanate, at least one isocyanate-reactive material having an average functionality of at least 2 and an equivalent weight of at least 200 per isocyanate-reactive group, at least one blowing agent, at least one surfactant and at least one catalyst, and a certain 3-oxopropanamide compound. Foams so produced emit low levels of aldehydes.

2 Claims, No Drawings

METHODS FOR REDUCING ALDEHYDE EMISSIONS IN POLYETHER POLYOLS AND POLYURETHANE FOAMS

This invention relates to polyether polyols and polyurethanes that exhibit low levels of aldehydes, and to methods for producing such polyurethanes.

Polyurethane foams are used in many office, household and vehicular applications. They are used, for example, in appliance applications and as cushioning for bedding and furniture. In automobiles and trucks, polyurethanes are used as seat cushioning, in headrests, in dashboards and instrument panels, in armrests, in headliners, noise, vibration and harshness abatement measures, as acoustical abatement measures, and other applications.

These polyurethanes often emit varying levels of aldehydes such as formaldehyde, acetaldehyde and propionaldehyde. Because of the cellular structure of these foams, aldehydes contained in the foam easily escape into the atmosphere. This can present an odor concern and an exposure concern, especially when people or animals are exposed to the material within an enclosed space. Vehicle manufacturers are imposing stricter limits on the emissions from materials that are used in the passenger cabins of cars, trucks, buses, trains and aircraft.

Scavengers are sometimes used to reduce aldehyde emissions from various types of materials. In the polyurethane field, there is, for example, WO 2006/111492, which describes adding antioxidants and hindered amine light stabilizers (HALS) to polyols to reduce aldehydes. WO 2009/114329 describes treating polyols with certain types of aminoalcohols and treating polyisocyanates with certain nitroalkanes, in order to reduce aldehydes in the polyols and polyisocyanates, respectively, and in polyurethanes made from those materials. JP 2005-154599 describes the addition of an alkali metal borohydride to a polyurethane formulation for that purpose. U.S. Pat. No. 5,506,329 describes the use of certain aldimine oxazolidine compounds for scavenging formaldehyde from polyisocyanate-containing preparations, and describes nitroalkanes and aminoalcohols as formaldehyde scavengers in textile and plywood applications.

These approaches provide limited benefit, in part because aldehydes present in polyurethane foam are not always carried in from the raw materials used to make the foam. Formaldehyde and acetaldehyde in particular can form during the curing step or when the foam is later subjected to UV light, elevated temperatures or other conditions.

WO 2018/148898 describes the use of aminoalcohols together with certain antioxidants to reduce aldehyde emissions from polyurethane foam. This combination provides some improvement, but a greater reduction of aldehyde emissions is wanted.

Certain acetoacetamide compounds are described as aldehyde scavengers for polyurethane foam in U.S. Pat. No. 10,196,493 and US Published Patent Application No. 2019-0119460.

A method for effectively and economically reducing aldehyde emissions is wanted. Preferably, this method does not result in a significant change in the properties or performance of the polyurethane.

This invention is a process for producing a polyurethane foam comprising forming a reaction mixture that contains an aromatic polyisocyanate, at least one isocyanate-reactive material having an average functionality of at least 2 and an equivalent weight of at least 200 grams per mole of isocyanate-reactive groups, at least one blowing agent, at least one surfactant and at least one catalyst, and curing the reaction mixture in the presence of at least one 3-oxopropanamide compound to form the polyurethane foam, wherein the 3-oxopropanamide compound is a compound represented by structure I:

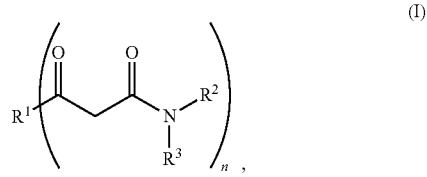

wherein $R^1$ is hydrogen or a hydrocarbon group, $R^2$ is hydrogen, hydrocarbon, hydroxyalkyl or aminoalkyl, $R^3$ is hydroxyalkyl or aminoalkyl, and n is at least 1.

The invention is also a process for reducing aldehyde emissions from a polyurethane foam, comprising: a) combining at least one 3-oxopropanamide compound with at least one isocyanate-reactive material having an average functionality of at least 2 and an equivalent weight of at least 200 grams per mole of isocyanate-reactive groups to form a mixture and then b) combining the mixture from step a) with at least one organic polyisocyanate and curing the resulting reaction mixture in the presence of at least one blowing agent, at least one surfactant and at least one catalyst to form a polyurethane foam, wherein the 3-oxopropanamide compound is a compound represented by structure I in which $R^1$ is hydrogen or a hydrocarbon group, $R^2$ is hydrogen, hydrocarbon, hydroxyalkyl or aminoalkyl, $R^3$ is hydrogen, hydroxyalkyl or aminoalkyl, and n is at least 1.

The invention is also a polyurethane foam made in either of the foregoing processes.

The invention is also a process for reducing aldehyde emissions from a polyether polyol, comprising combining 0.01 to 5 parts by weight of at least one 3-oxopropanamide compound with 100 parts by weight of the polyether polyol, wherein the 3-oxopropanamide compound is a compound represented by structure I in which $R^1$ is hydrogen or an unsubstituted or inertly substituted hydrocarbon group, $R^2$ is hydrogen, hydrocarbon, hydroxyalkyl or aminoalkyl, $R^3$ is hydrogen, hydroxyalkyl or aminoalkyl, and n is at least 1.

The invention is also a polyether polyol having a hydroxyl equivalent weight of at least 200 grams per equivalent of hydroxyl groups, which contains 0.01 to 5 parts by weight of at least one 3-oxopropanamide compound per 100 parts by weight of the polyether polyol, wherein the 3-oxopropanamide compound is a compound represented by structure I in which $R^1$ is hydrogen or an unsubstituted or inertly substituted hydrocarbon group, $R^2$ is hydrogen, hydrocarbon, hydroxyalkyl or aminoalkyl, $R^3$ is hydrogen, hydroxyalkyl or aminoalkyl, and n is at least 1.

The presence of the 3-oxopropanamide compound of structure I has been found to reduce the levels of aldehydes emitted by the polyurethane foam and by the polyether polyol. The 3-oxopropanamide compound has the further advantage of being reactive toward isocyanate groups. As such, it reacts during the curing step to become incorporated into the polyurethane polymer structure. This further reduces emissions of organic compounds. In addition, the 3-oxopropanamide compounds of structure I are resistant to hydrolysis, which reduces the generation and potential emission of volatile hydrolysis by-products. The 3-oxopropanamide compounds do not increase the total volatile organic compounds in the polyether polyol or the foam.

In structure I, $R^1$ is hydrogen or a hydrocarbon group. If a hydrocarbon group, $R^1$ may be aromatic, aliphatic, alicyclic or any combination thereof. $R^1$ preferably has up to 50 carbon atoms, more preferably up to 10 carbon atoms, up to 6 carbon atoms or up to 4 carbon atoms.

In specific embodiments, $R^1$ may be alkyl such as methyl, ethyl, propyl, butyl, pentyl, hexyl and the like (including any isomers of any of the foregoing; cyclohexyl; alkyl-substituted cyclohexyl; phenyl and alkyl-substituted phenyl, in each case preferably having up to 10, especially up to 6 carbon atoms.

In some embodiments, $R^2$ is hydrogen or an aminoalkyl or hydroxyalkyl group having up to 6, preferably 2 to 4, carbon atoms. $R^2$ is most preferably hydrogen.

$R^3$ is preferably hydroxyalkyl having up to 6, especially 2 to 4, carbon atoms. $R^3$ is most preferably 2-hydroxyethyl (—$CH_2$—$CH_2$—OH) or 2-hydroxypropyl (—$CH_2$CH($CH_3$)—OH).

n is preferably 1 to 6, more preferably 1 to 4. In specific embodiments, n may be 1, 2, 3 or 4. n is most preferably 1.

In some embodiments, $R^1$ is phenyl or alkyl having up to 6 carbon atoms, $R^2$ is hydrogen, $R^3$ is 2-hydroxyethyl or 2-hydroxypropyl and n is 1. A particularly preferred 3-oxopropanamide is N-(2-hydroxyethyl)-3-oxobutanamide, which corresponds to structure I in which $R^1$ is methyl, $R^2$ is hydrogen, $R^3$ is 2-hydroxyethyl and n is 1.

To produce foam in accordance with the invention, at least one polyisocyanate is reacted with at least one isocyanate-reactive compound that has a functionality of at least 2 and an equivalent weight of at least 200 gram per mole of isocyanate-reactive groups. Other ingredients may be present as discussed hereinbelow. The reaction is performed in the presence of the 3-oxopropanamide compound of structure I.

A suitable amount of 3-oxopropanamide compound is 0.01 to 5 pph (i.e., 0.01 to 5 parts by weight per 100 parts by weight of isocyanate reactive compound(s) that have at least two isocyanate-reactive groups per molecule and an equivalent weight of at least 200 per isocyanate-reactive group). A preferred minimum amount is at least 0.1 or at least 0.2 pph and a preferred maximum amount is up to 2.5, up to 1.5, up to 1, up to 0.75 or up to 0.5 pph.

The 3-oxopropaneamide compound of structure I can be provided as a mixture with any one or more of the various ingredients of the formulation used to produce the foam. Alternatively, it may be added into the reaction as a separate component or stream without being previously combined with any of the other ingredients.

Preferably, however, the 3-oxopropanamide compound is blended with the isocyanate reactive compound(s) that have at least two isocyanate-reactive groups per molecule and an equivalent weight of at least 200 grams per mole of isocyanate-reactive groups, prior to forming the polyurethane foam. The isocyanate-reactive compound(s) preferably include at least one polyether polyol. The resulting blend may be maintained at approximately room temperature or a higher temperature (but below the boiling temperature of the 3-oxopropanamide compound and below the temperature at which the polyol degrades) for a period of at least 30 minutes prior to making the foam. Such a blend may be maintained under such conditions for any arbitrarily longer time, such as up to a month, up to a week, or up to a day.

The foam formulation includes at least one isocyanate-reactive compound that has a functionality of at least 2 and an equivalent weight of at least 200 grams per mole of isocyanate-reactive groups. "Functionality" refers to the average number of isocyanate-reactive groups per molecule. The functionality may be as much as 8 or more but preferably is from 2 to 4. The isocyanate groups may be, for example, hydroxyl, primary amino and/or secondary amino groups, but hydroxyl groups are preferred. The equivalent weight may be up to 6000 or more, but is preferably from 500 to 3000 and more preferably from 1000 to 2000. This isocyanate-reactive compound may be, for example, a polyether polyol, a polyester polyol, a hydroxyl-terminated butadiene polymer or copolymer, a hydroxyl-containing acrylate polymer, and the like. A preferred type of isocyanate-reactive compound is a polyether polyol, especially a polymer of propylene oxide or a copolymer of propylene oxide and ethylene oxide. A copolymer of propylene oxide and ethylene oxide may be a block copolymer having terminal poly(oxyethylene) blocks and in which at least 50% of the hydroxyl groups are primary. Another suitable copolymer of propylene oxide and ethylene oxide may be a random or pseudo-random copolymer, which may also contain terminal poly(oxyethylene) blocks and in which at least 50% of the hydroxyl groups are primary.

Polyester polyols that are useful as the isocyanate-reactive compound include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of about 150 or less and include ethylene glycol, 1,2- and 1,3-propylene glycol, 1,4- and 1,3-butane diol, 1,6-hexane diol, 1,8-octane diol, neopentyl glycol, cyclohexane dimethanol, 2-methyl-1,3-propane diol, glycerine, trimethylolpropane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols such as those sold by The Dow Chemical Company under the trade name "Tone" are also useful.

Mixtures of two or more of the foregoing isocyanate-reactive compounds having a functionality of at least 2 and an equivalent weight of at least 200 per isocyanate-reactive group can be used if desired.

The isocyanate-reactive compound(s) may contain dispersed polymer particles. These so-called polymer polyols contain, for example, particles of vinyl polymers such as styrene, acrylonitrile or styrene-acrylonitrile, particles of a polyurea polymer, or polymers of a polyurethane-urea polymer, in each case dispersed in a continuous polyol phase.

In addition, the foregoing isocyanate-reactive compounds can be used in admixture with one or more crosslinkers and/or chain extenders. For purposes of this specification, "crosslinkers" are compounds having at least three isocyanate-reactive groups per molecule and an equivalent weight per isocyanate-reactive group of below 200 grams per mole of isocyanate groups. "Chain extenders" for purposes of this invention have exactly two isocyanate-reactive groups per molecule and have an equivalent weight per isocyanate-reactive group of below 200 grams per mole of isocyanate-reactive groups. In each case, the isocyanate-reactive groups are preferably hydroxyl, primary amino or secondary amino groups. Crosslinkers and chain extenders preferably have equivalent weights of up to 150 and more preferably up to about 125.

Examples of crosslinkers include glycerin, trimethylolpropane, trimethylolethane, diethanolamine, triethanolamine, triisopropanolamine, alkoxylates of any of the foregoing that have equivalent weights of up to 199, and the like. Examples of chain extenders include alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), ethylene diamine, toluene diamine, diethyltoluene diamine and the like, as well as alkoxylates of any of the foregoing that have equivalent weights of up to 199, and the like.

Crosslinkers and/or chain extenders are typically present in small amounts (if at all). A preferred amount is from 0 to 5 pph of crosslinkers and/or chain extenders. A more preferred amount is from 0.05 to 2 pph and a still more preferred amount is from 0.1 to 1 pph of one or more crosslinkers.

Examples of suitable polyisocyanates include, for example, m-phenylene diisocyanate, 2,4- and/or 2,6-toluene diisocyanate (TDI), the various isomers of diphenylmethanediisocyanate (MDI), the so-called polymeric MDI products (which are a mixture of polymethylene polyphenylene polyisocyanates in monomeric MDI), carbodiimide-modified MDI products (such as the so-called "liquid MDI" products which have an isocyanate equivalent weight in the range of 135-170), hexamethylene-1,6-diisocyanate, tetramethylene-1,4-diisocyanate, cyclohexane-1,4-diisocyanate, hexahydrotoluene diisocyanate, hydrogenated MDI ($H_{12}$MDI), isophorone diisocyanate, naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenyl methane-4,4'-diisocyanate, 4,4',4"-triphenylmethane diisocyanate, hydrogenated polymethylene polyphenylpolyisocyanates, toluene-2,4,6-triisocyanate and 4,4'-dimethyldiphenylmethane-2,2',5,5'-tetraisocyanate. Any of the foregoing that are modified to contain urethane, urea, uretonimine, biuret, allophonate and/or carbodiimide groups may be used.

Preferred isocyanates include TDI, MDI and/or polymeric MDI, as well as derivatives of MDI and/or polymeric MDI that contain urethane, urea, uretonimine, biuret, allophonate and/or carbodiimide groups. An especially preferred isocyanate is a mixture of TDI and MDI.

The amount of polyisocyanate provided to the foam formulation is expressed as the "isocyanate index", which is 100 times the ratio of isocyanate groups to isocyanate-reactive groups in the foam formulation. The isocyanate index is typically from about 60 to 150. A preferred isocyanate index is from 60 to 125 and a more preferred isocyanate index is from 65 to 115. In some embodiments, the isocyanate index is from 70 to 115 or from 75 to 115.

The blowing agent may be a chemical (exothermic) type, a physical (endothermic) type or a mixture of at least one of each type. Chemical types typically react or decompose to produce carbon dioxide or nitrogen gas under the conditions of the foaming reaction. Water and various carbamate compounds are examples of suitable chemical blowing agents. Physical types include carbon dioxide, various low-boiling hydrocarbons, hydrofluorocarbons, hydroflurochlorocarbons, ethers and the like. Water is most preferred blowing agent, either by itself or in combination with one or more physical blowing agents.

Blowing agents are present in amounts sufficient to provide the desired foam density. When water is the blowing agent, a suitable amount is generally from 1.5 to 6 pph, preferably from 2 to 5 pph.

Suitable surfactants are materials that help to stabilize the cells of the foaming reaction mixture until the materials have cured. A wide variety of silicone surfactants as are commonly used in making polyurethane foams can be used in making the foams with the polymer polyols or dispersions of this invention. Examples of such silicone surfactants are commercially available under the tradenames Tegostab™ (Evonik Corporation), Niax™ (Momentive) and Dabco™ (Air Products and Chemicals).

Surfactants are typically present in amounts up to 5 pph, more typically 0.1 to 2 pph and preferably 0.25 to 1.5 pph.

Suitable catalysts include those described by U.S. Pat. No. 4,390,645, which is incorporated herein by reference. Representative catalysts include:

(a) tertiary amines, such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine,4,4'-(oxydi-2, 1-ethanediyl)bis, tri(dimethylaminopropyl)amine, pentamethyldiethylenetriamine and triethylenediamine and the like; as well as so-called "low emissive" tertiary amine catalysts that contain one or more isocyanate-reactive groups such as dimethylaminepropylamine and the like;

(b) tertiary phosphines, such as trialkylphosphines and dialkylbenzylphosphines;

(c) chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni;

(d) acidic metal salts of strong acids, such as ferric chloride, stannic chloride, stannous chloride, antimony trichloride, bismuth nitrate and bismuth chloride;

(e) strong bases, such as alkali and alkaline earth metal hydroxides, alkoxides and phenoxides;

(f) alcoholates and phenolates of various metals, such as Ti(OR)$_4$, Sn(OR)$_4$ and Al(OR)$_3$, wherein R is alkyl or aryl, and the reaction products of the alcoholates with carboxylic acids, beta-diketones and 2-(N,N-dialkylamino)alcohols;

(g) salts of organic acids with a variety of metals, such as alkali metals, alkaline earth metals, Al, Sn, Pb, Mn, Co, Ni and Cu including, for example, sodium acetate, stannous octoate, stannous oleate, lead octoate, metallic driers, such as manganese and cobalt naphthenate; and (h) organometallic derivatives of tetravalent tin, trivalent and pentavalent As, Sb and Bi and metal carbonyls of iron and cobalt.

Catalysts are typically present in small amounts, such as up to 2 pph and generally up to 1 pph. A preferred amount of catalyst is from 0.05 to 1 pph.

The foam can be produced in the presence of additional compounds that reduce aldehyde and/or other emissions in the resulting foam. Among these are aminoalcohol compounds, which are characterized in having at least one primary or secondary amino group and at least one hydroxyl group, each being bonded to an aliphatic carbon atom, and alkylhydroxylamine compounds that include an —NH—OH group wherein the nitrogen atom is bonded to an aliphatic carbon atom.

Aminoalcohol compounds are known and include, for example, those described in US Publication Nos. 2009/0227758 and 2010/0124524, each of which are incorporated herein in their entirety.

In some embodiments, the aminoalcohol or alkylhydroxylamine compound is a compound represented by structure II:

(II)

or a salt of such a compound, wherein $R^6$, $R^7$ and $R^8$ each are independently H, alkyl optionally substituted with phenyl or $NR^9R^{10}$ wherein $R^9$ and $R^{10}$ are independently H, $C_1$-$C_6$ alkyl, phenyl, or hydroxyalkyl optionally independently substituted with phenyl or $NR^9R^{10}$;

$R^5$ is H, hydroxyl, phenyl, alkyl optionally substituted with phenyl or $NR^9R^{10}$, or hydroxyalkyl optionally independently substituted with phenyl or $NR^9R^{10}$, provided that when none of $R^6$, $R^7$ and $R^8$ are hydroxyalkyl, then $R^5$ is hydroxyl or hydroxyalkyl optionally independently substituted with phenyl or $NR^9R^{10}$.

Specific examples of suitable aminoalcohols are 2-amino-1-butanol, 2-amino-2-ethyl-1,3-propanediol, 2-amino-2-methyl-1-propanol, 2-amino-1-methyl-1,3-propanediol, 1,1,1-tris (hydroxymethyl) methylamine, ethanolamine, diethanolamine, N-methylethanolamine, N-butylethanolamine, monoisopropanolamine, 2-amino-2(hydroxymethyl)propane-1,3-diol. diisopropanolamine, mono-sec-butanolamine, di-sec-butanolamine, or salts thereof. These aminoalcohols are available from a variety of commercial sources, including ANGUS Chemical Company (Buffalo Grove, Ill., USA), The Dow Chemical Company (Midland, Mich., USA), or can be readily prepared by techniques well known in the art. The aminoalcohols can be used in the form of salts. Suitable salts include hydrochloride, acetate, formate, oxalate, citrate, carbonate, sulfate, and phosphate salts.

Specific examples of alkylhydroxylamines include N-isopropylhydroxylamine, N-ethylhydroxylamine, N-methylhydroxylamine, N-(n-butyl)hydroxylamine, N-(sec-butyl)hydroxylamine and the like.

The foam may be produced in the presence of at least one antioxidant. Examples of suitable antioxidants include phenolic compounds, aminic antioxidants, thiosynergists such as dilauryl thiodipropionate or distearyl thiodipropionate, phosphites and phosphonites, benzofuranones and indolinones such as those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102; tocophenols, hydroxylated thiodiphenyl ethers, O-, N- and S-benzyl compounds, hydroxybenzylated malonates, triazine compounds, benzylphosphonates, acylaminophenols, amides of β-(3,5-di-tert-butyl-4-hydroxyphenyl)propionic acid, ascorbic acid (vitamin C), 2-(2'-hydroxyphenyl)benzotriazoles, 2-hydroxybenzophenones, esters of substituted and unsubstituted benzoic acids, acrylates, nickel compounds, oxamides, 2-(2-hydroxyphenyl)-1,3,5-triazines, hydroxylamines, nitrones, esters of β-thiodipropionic acid, as described, for example, in U.S. Pat. No. 6,881,774, incorporated herein by reference.

The antioxidant(s), when used, are present in an effective amount, such as up to about 10 pph. A preferred amount is from 0.1 to 5 pph, and a more preferred amount is from 0.2 to 1.5 pph.

In some embodiments, a HALS (hindered amine light stabilizer) compound is present. Suitable HALS compounds include bis(1-octyloxy)-2,2,5,5-tetramethyl-4-piperidinyl) sebacate (Tinuvin™ 123 from BASF), n-butyl-(3,5-di-tert-butyl-4-hydroxylbenzyl)bis-(1,2,2,6-pentamethyl-4-piperidinyl)malonate (Tinuvin™ 144 from BASF), dimethyl succinate polymer with 4-hydroxy-2-2,6,6-tetramethyl-1-piperidinethanol (Tinuvin™ 622 from BASF), bis(1,2,2,6,6-pentamethyl-4-piperidinyl) sebacate (Tinuvin™ 765 from BASF) and bis(2,2,6,6-tetramethyl-4-piperidinyl) sebacate (Tinuvin™ 770 from BASF) and the like.

The HALS compound, when used, is present in an effective amount, such as up to about 10 pph. A preferred amount is from 0.1 to 5 pph, and a more preferred amount is from 0.1 to 2.5 pph.

Other ingredients may be present during the foaming step, including, for example, fillers, colorants, odor masks, flame-retardants, biocides, antistatic agents, thixotropic agents and cell openers.

Polyurethane foam is made in accordance with this invention by forming a reaction mixture containing the various ingredients and curing the reaction mixture. Free-rise processes such as continuous slabstock production methods can be used. Alternatively, molding methods can be used. Such processes are well known. Generally, no alternation of conventional processing operations is needed to produce polyurethane foam in accordance with this invention (other than the inclusion of the 3-oxopropanamide compound of structure I).

The various ingredients may be introduced individually or in various subombinations into a mixhead or other mixing device where they are mixed and dispensed into a region (such as a trough or other open container, or a closed mold) where they are cured. It is often convenient, especially when making molded foam, to form a formulated polyol component that contains the isocyanate-reactive compound(s), including crosslinkers and/or chain extenders as may be used, the 3-oxopropanamide compound of structure I, other additives (if present) and optionally the catalyst(s), surfactant(s) and blowing agent(s). This formulated polyol component is then contacted with the polyisocyanate (as well as any other ingredients that are not present in the formulated polyol component) to produce the foam.

Some or all of the various components may be heated prior to mixing them to form the reaction mixture. In other cases, the components are mixed at approximately ambient temperatures (such as from 15-40° C.). Heat may be applied to the reaction mixture after all ingredients have been mixed, but this is often unnecessary.

The product of the curing reaction is a flexible polyurethane foam. The foam density may be from 20 to 200 kg/m³. For most seating and bedding applications, a preferred density is from 24 to 80 kg/m³. The foam may have a resiliency of at least 50% on the ball rebound test of ASTM 3574-H. Foams produced in accordance with this invention are useful, for example, in cushioning applications such as bedding and domestic, office or vehicular seating, as well as in other vehicular applications such as headrests, dashboards instrument panels, armrests, headliners, noise, vibration and harshness (NVH) abatement foam, and acoustical foam.

Polyurethane foams made in accordance with the invention are characterized in having reduced emissions of aldehydes, in particular one or more of formaldehyde, acetaldehyde, acrolein and propionaldehyde, compared to the case in which the 3-oxopropanamide compound of structure I is absent. A suitable method for measuring formaldehyde, acetaldehyde, acrolein and propionaldehyde emissions is as follows: The polyurethane foam sample is crushed to open the cells. The crushed foam is cut into cubic 10 cm×10 cm×14 cm samples, which are immediately packaged tightly in aluminum foil or polyethylene film and kept in this manner for 5 days at about 25° C.

Aldehyde concentrations are measured according to the Toyota TSM0508G test method. In that Toyota method, the foam sample is removed from the foil or film and then placed in individual 10 L Tedlar gas bags (Delin Co., Ltd., China) that have previously been purged three times with nitrogen gas. The bag with the foam sample is filled with 7 L of nitrogen, sealed and heated 65° C. for two hours. The plastic bag containing the foams is removed from the oven. The gas in the bag is pumped through a 350 mg dinitrophenylhydrazine cartridge to capture the carbonyl compounds. The captured carbonyl compounds are analyzed for formaldehyde, acetaldehyde, acrolein and propionaldehyde by liquid chromatography, with results being expressed in terms of weight of the respective aldehyde per cubic meter of gas in the gas bag. Details for a specific method of performing the Toyota test method are described in the following examples.

The amount of emitted formaldehyde, acetaldehyde, acrolein and propionaldehyde as determined in this method are all typically at least 15%, usually at least 50%, and sometimes as much as 60 to 98%, reduced as compared to an otherwise like foam that is produced in the absence of the 3-oxopropanamide compound of structure I. An advantage of this invention is that significant reductions are seen in the emitted amounts of some or even all of these aldehyde compounds.

In some embodiments, the amount of emitted formaldehyde is no greater than 200 µg/m$^3$, no greater than 150 µg/m$^3$ or no greater than 100 µg/m$^3$, as measured according to the Toyota method. In some embodiments, the amount of emitted acetaldehyde is no greater than 100 µg/m$^3$, as measured according to Toyota method. In some embodiments, the amount of emitted propionaldehyde is no greater than 100 µg/m$^3$, as measured according to the Toyota method.

The following examples are provided to illustrate the invention, but are not intended to limit the scope thereof. All parts and percentages are by weight unless otherwise indicated.

EXAMPLE 1 AND COMPARATIVE SAMPLE A

Ex. 1: 3 grams of an 1800 equivalent weight random copolymer of propylene oxide and ethylene oxide and 200 mg of N-(2-hydroxyethyl)-3-oxobutanamide (HEOBA) are mixed. 0.2 grams of the mixture are weighed into a headspace vial and conditioned at 100° C. for 10 minutes. The headspace is then analyzed for acetaldehyde and propionaldehyde by gas chromatography/mass spectrometry.

Comp. Sample A: For comparison, a sample of the random copolymer by itself is treated and analyzed in the same way. Results are as indicated in Table 1. Aldehyde concentrations are expressed in parts by weight per million parts of the random copolymer.

TABLE 1

| | Parts Per Million | | |
|---|---|---|---|
| | Comp. Sample A (no HEOBA) | Ex. 1 (w/HEOBA) | % Aldehyde Reduction with HEOBA |
| Acetaldehyde | 158 | 7 | 96% |
| Propionaldehyde | 1.0 | 0.1 | 90% |

The HEOBA is found to vastly reduce aldehyde generation in the polyether polyol.

EXAMPLES 2-4 AND COMPARATIVE SAMPLE. B-F

General foaming method: A formulated polyol is made by combining 40 parts of a nominally trifunctional polyether polyol having a hydroxyl number of 29.5, 52.7 parts of a 1700 equivalent weight polyether polyol initiated from a mixture of sucrose and glycerine, 0.8 part of glycerine, 1.6 parts of a urethane catalyst mixture, 0.5 parts of an organosilicone foam-stabilizing surfactant and 4.2 parts of water. Polyurethane foams are made from the formulated polyol by combining the formulated polyol with an isocyanate-terminated prepolymer at a 1.8:1 weight ratio, pouring the resulting reaction mixture into a cup and allowing the reaction mixture to rise and cure to form a polyurethane foam. After the foam has cured enough to be dimensionally stable, it is removed from the cup and, except for Comparative Samples B and C, 10 cm×10 cm×14 cm samples, weighing about 38 to 41 grams are cut. For Comparative Samples B and C, 30 gram samples are cut. The foam cubes each are immediately wrapped in aluminum foil to form an air-tight package for 7 days.

Comparative Samples B and C are made using the general foaming method. Comparative Sample B is made without any additive. In Comparative Sample C, 0.1% of trimethylolpropane triacetylacetate ester (AATMP) (based on formulated polyol weight) is added to the formulated polyol before making the foam.

Comparative Sample D and Example 2 are made in the same manner. Comparative Sample D contains no additive. In Example 2, 0.3% of HEOBA is added to the formulated polyol before making the foam.

Comparative Sample E and Example 3 also are made in the same manner. Comparative Sample E contains no additive. In Example 3, 0.17% of HEOBA is added to the formulated polyol before making the foam.

Comparative Sample F and Example 4 also are made in the same manner. Comparative Sample F contains no additive. In Example 4, 0.1% of HEOBA is added to the formulated polyol before making the foam.

Aldehydes emitted from the foam samples are analyzed using the Toyota gas bag method. The cubed foam samples are in each case removed from the foil and put into a 10 L Tedlar gas bag that has been washed with pure nitrogen three times and emptied. An empty gas bag is used as a blank. After the foam sample is put into the gas bag, the bag is filled with about 7 L of nitrogen gas and heated in the oven for 2 hours at 65° C. The nitrogen gas in the gas bag is then pumped out by an air pump and analyzed for formaldehyde, acetaldehyde and propionaldehyde.

The gas from each bag is passed through a dinitrophenylhydrazine (DNPH) cartridge (CNWBOND DNPH-Silica cartridge, 350 mg, Cat. No. SEEQ-144102, Anple Co., Ltd.) at a sampling speed is 330 mL/min. The aldehydes emitted from the foam into the gas are absorbed by the cartridge to form DNPH derivatives. The DNPH cartridge is eluted with 3 g of acetonitrile, and the resulting acetonitrile solution is analyzed by HPLC to quantify the carbonyls in the sample, as follows.

A standard solution containing 15 µg/mL each of formaldehyde, acetaldehyde, acrolein, acetone, and propionaldehyde (in each case in the form of DNPH derivatives) (TO11A carbonyl-DNPH mix, Cat. No. 48149-U, Supelco Co., Ltd) is diluted with acetonitrile. A vial containing 2 mL of the diluted solution (containing 0.794 ppm of each of formaldehyde, acetaldehyde and propionaldehyde) is refrigerated to −4° C. The refrigerated solution is injected into the HPLC system and analyzed for formaldehyde, acetaldehyde, acrolein and propionaldehyde derivatives. The response factor is calculated from the area of the elution peak for each derivative, according the formula:

$$\text{Response factor } i = \frac{\text{Peak Area } i}{0.794}$$

where Response factor i=Response factor of derivative i; Peak Area i=Peak Area of derivative i in standard solution and 0.794=the concentration of each derivative in the standard solution.

The amounts of formaldehyde, acetaldehyde, acrolein, and propionaldehyde emitted by each foam sample are then determined. Acetone and volatile organic compounds (TVOC) are also measured. In each case, the acetonitrile solution obtained by eluting the DNPH column is injected into the HPLC system and the area of the elution peak is determined from each derivative. The concentration of the aldehyde-DNPH derivative in the sample solution is calculated as follows:

$$\text{Concentration of } i = \frac{\text{Peak Area } i}{\text{Response factor } i}$$

where: Concentration of i=Concentration of aldehyde-DNPH derivative in the sample solution, Peak Area i=Peak Area of Derivative i in sample solution and Response factor i=Response factor of derivative i, determined from the standard solutions as described above.

The HPLC conditions are as follows:

| Instrument: | Agilent 1200 HPLC |
|---|---|
| Column: | Supelco Ascentis Express C18, 15 cm*4.6 mm, 2.7 um |
| Mobile Phase: | Solvent A: 0.1% $H_3PO_4$ in Acetonitrile |
| | Solvent B: 0.1% $H_3PO_4$ in DI water |
| Column Oven: | 15° C. |
| Detection: | DAD detector at 360 nm |

| Gradient: | Time (mn) | % A | % B | Flow (mL/min) |
|---|---|---|---|---|
| | 0 | 45 | 55 | 1 |
| | 7 | 45 | 55 | 1 |
| | 14 | 50 | 50 | 1 |
| | 20 | 85 | 15 | 1 |
| | 25 | 100 | 0 | 1 |
| Equilibration Time: | 5 min | | | |
| Injection: | 10 uL | | | |

The concentrations of formaldehyde, acetaldehyde acrolein, acetone and propionaldehyde for each of Comparative Samples B-F and Examples 2-4 are as indicated in Tables 2-5.

TABLE 2

| | Comp. B*<br>No<br>Additive | Comp. C*<br>0.1%<br>AATMP | % Reduction<br>with<br>AATMP |
|---|---|---|---|
| Formaldehyde, µg/m³ | 64.2 | 62.9 | 2% |
| Acetaldehyde, µg/m³ | 77.6 | 63.2 | 19% |
| Acrolein, µg/m³ | 0 | 20.8 | — |
| Propionaldehyde, µg/m³ | 61.8 | Not Detected | 100% |

*Not an example of this invention.

As the data in Table 2 shows, AATMP leads to only small reductions in the amounts of emitted formaldehyde and acetaldehyde.

TABLE 3

| | Comp. D*<br>No<br>Additive | Ex. 2<br>0.3%<br>HEOBA | % Reduction<br>with 0.3%<br>HEOBA |
|---|---|---|---|
| TVOC, µg/m³ | 1814 | 1225 | 32.5% |
| Formaldehyde, µg/m³ | 469 | 69 | 85% |
| Acetaldehyde, µg/m³ | 145 | 78 | 46% |
| Acrolein, µg/m³ | 411 | 84 | 80% |
| Acetone, µg/m³ | 50 | 16 | 68% |
| Propionaldehyde, µg/m³ | 100 | 49 | 51% |

*Not an example of this invention.

TABLE 4

| | Comp. E*<br>No<br>Additive | Ex. 3<br>0.17%<br>HEOBA | % Reduction<br>with 0.17%<br>HEOBA |
|---|---|---|---|
| TVOC, µg/m³ | 1148 | ND | ND |
| Formaldehyde, µg/m³ | 444 | 108 | 76% |
| Acetaldehyde, µg/m³ | 67 | 57 | 15% |
| Acrolein, µg/m³ | 284 | 67 | 76% |
| Acetone, µg/m³ | 157 | 84 | 46% |
| Propionaldehyde, µg/m³ | 156 | 87 | 44% |

*Not an example of this invention.
ND—not determined.

TABLE 5

| | Comp. F*<br>No<br>Additive | Ex. 3<br>0.1%<br>HEOBA | % Reduction<br>with 0.1%<br>HEOBA |
|---|---|---|---|
| TVOC, µg/m³ | 2251 | 1808 | 20% |
| Formaldehyde, µg/m³ | 349 | 151 | 57% |
| Acetaldehyde, µg/m³ | 77 | 44 | 43% |
| Acrolein, µg/m³ | 433 | 78 | 82% |
| Acetone, µg/m³ | 93 | 41 | 44% |
| Propionaldehyde, µg/m³ | 91 | 74 | 19% |

*Not an example of this invention.

As the data in Tables 3 and 5 shows, the addition of 0.1 to 0.3% HEOBA results in significant decreases in formaldehyde, acetaldehyde, proprionaldehyde, acrolein and acetone emissions.

What is claimed is:

1. A process for producing a polyurethane foam comprising forming a reaction mixture that contains an aromatic polyisocyanate, at least one isocyanate-reactive material having an average functionality of at least 2 and an equivalent weight of at least 200 grams per mole of isocyanate-reactive groups, at least one blowing agent, at least one surfactant and at least one catalyst, and curing the reaction mixture in the presence of at least one 3-oxopropanamide compound, to form the polyurethane foam, wherein the 3-oxopropanamide compound is a compound represented by the structure:
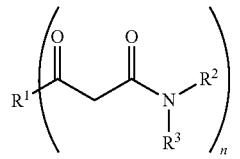
wherein $R^1$ is phenyl or alkyl having up to 6 carbon atoms, $R^2$ is hydrogen, $R^3$ is 2-hydroxyethyl or 2-hydroxypropyl and n is 1.
2. The process of claim 1, wherein the 3-oxopropanamide is N-(2-hydroxyethyl)-3-oxobutanamide.
\* \* \* \* \*